W. G. WILL.
TRANSMISSION DEVICE.
APPLICATION FILED APR. 20, 1917.
1,248,583.
Patented Dec. 4, 1917.
3 SHEETS—SHEET 2.
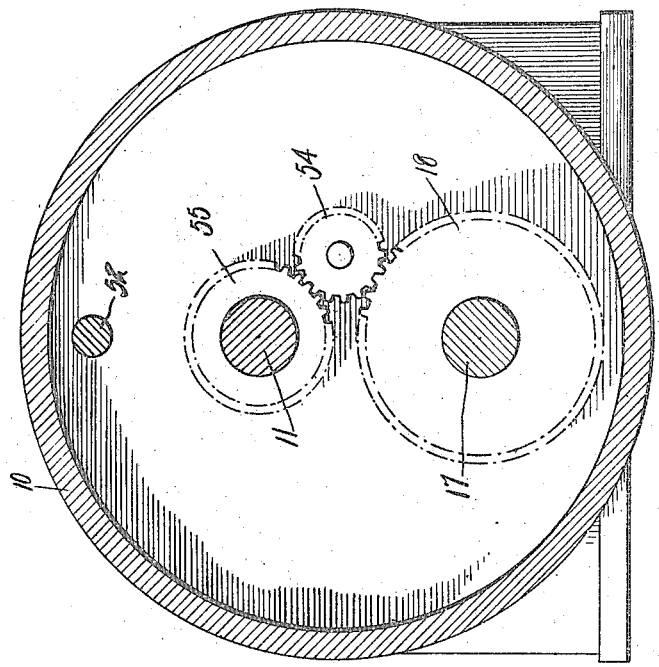
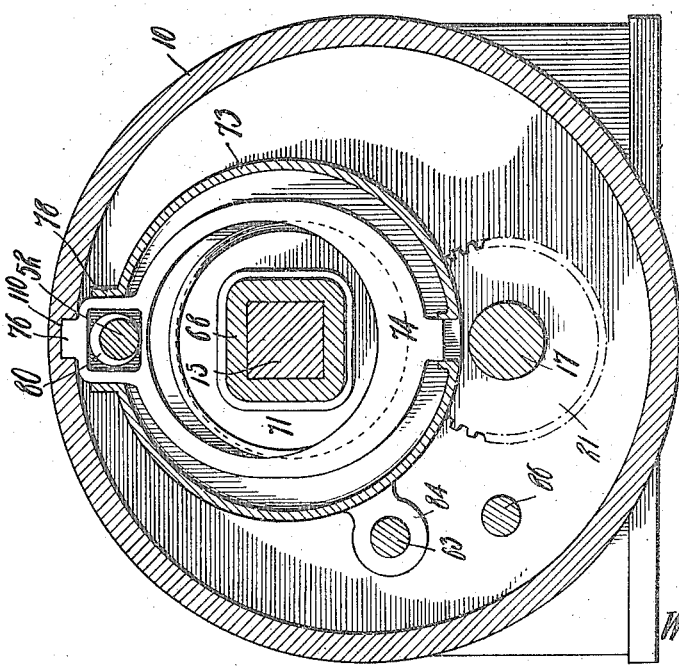
WITNESSES
INVENTOR
William G. Will
BY
ATTORNEY

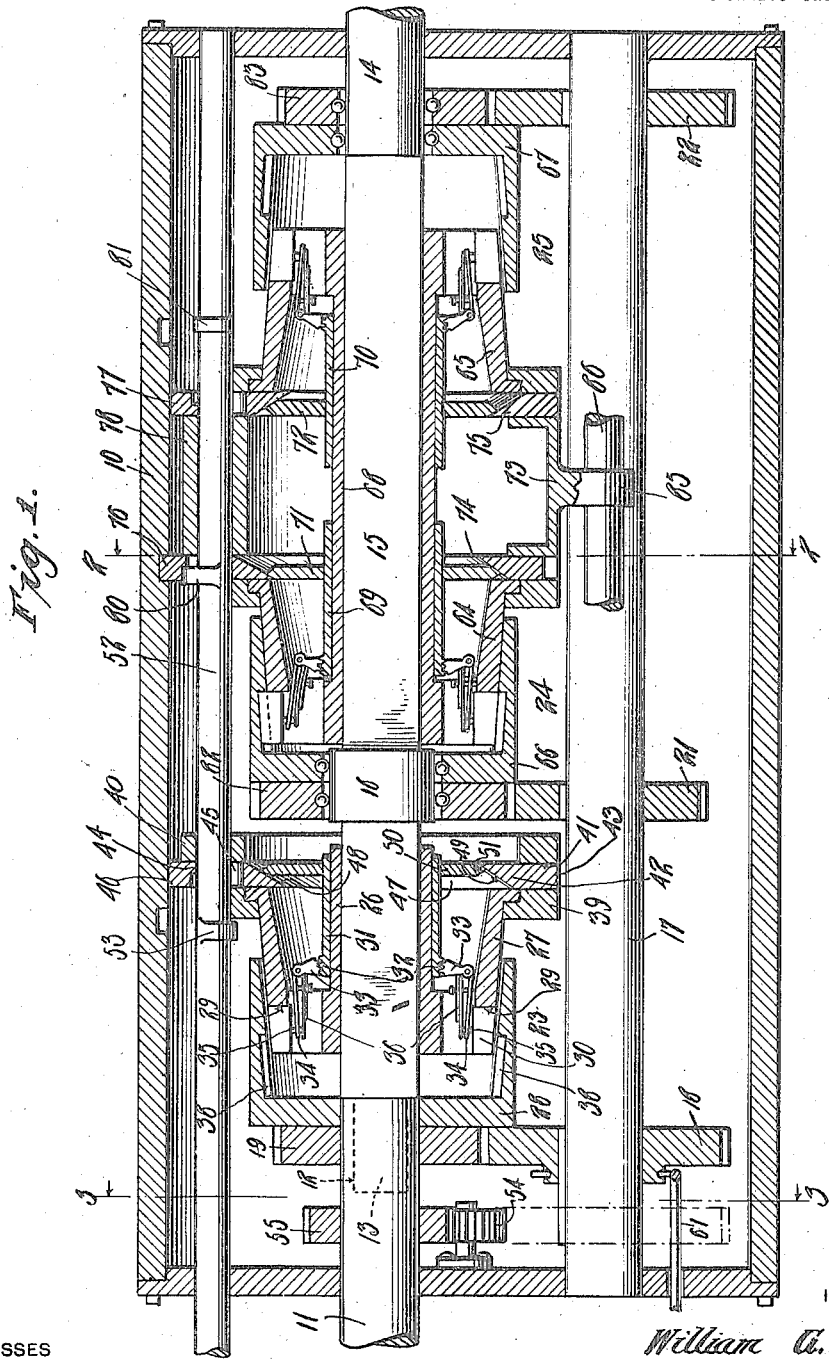

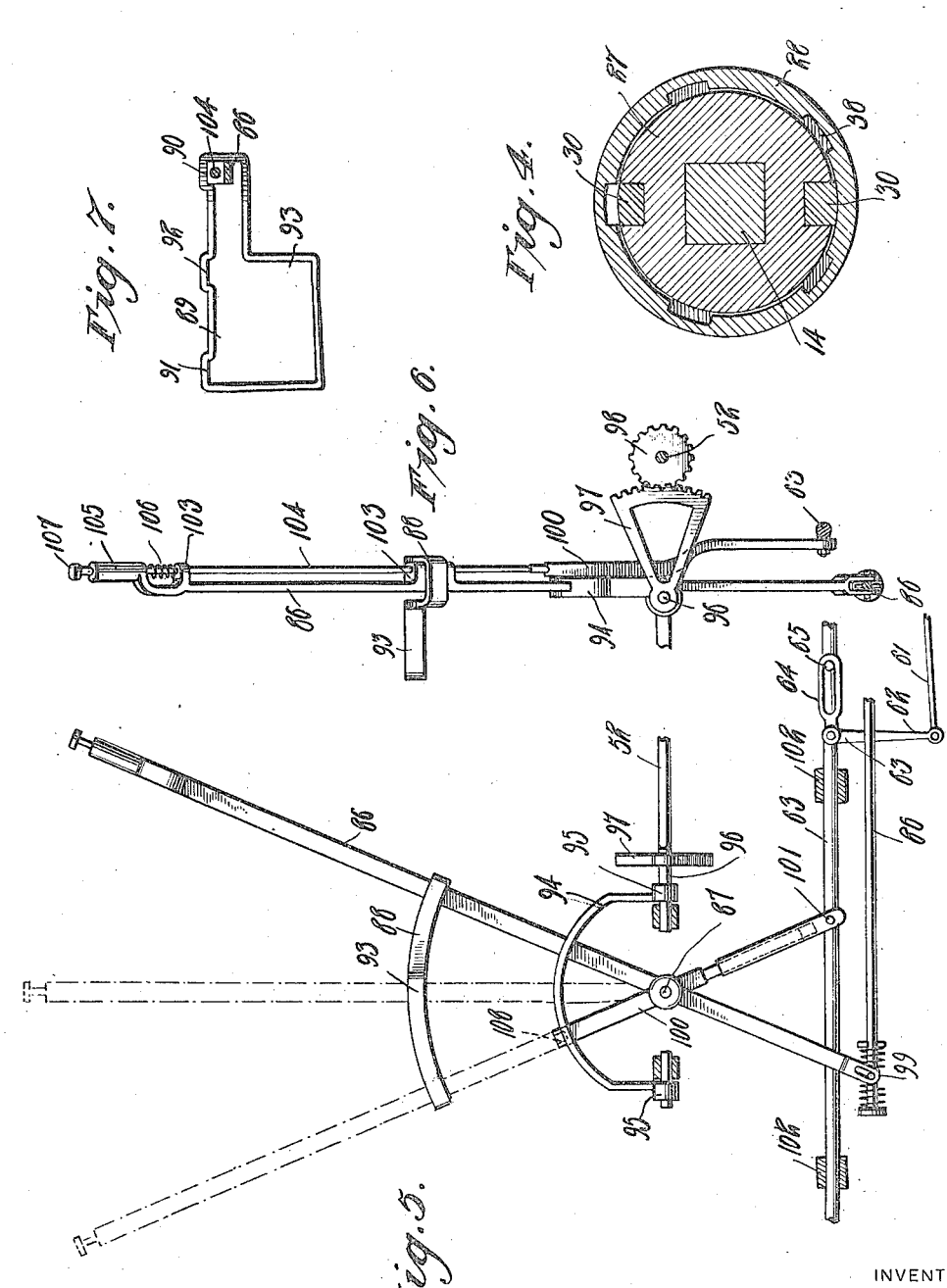

UNITED STATES PATENT OFFICE.

WILLIAM G. WILL, OF FAIRVIEW, ILLINOIS.

TRANSMISSION DEVICE.

1,248,583.  Specification of Letters Patent.  Patented Dec. 4, 1917.

Application filed April 20, 1917. Serial No. 163,472.

*To all whom it may concern:*

Be it known that I, WILLIAM G. WILL, a citizen of the United States, residing at Fairview, in the county of Fulton and State of Illinois, have invented certain new and useful Improvements in Transmission Devices, of which the following is a specification.

This invention has relation to transmission devices for self propelled vehicles, and has for an object to provide a device including a plurality of pairs of gears of varying ratios and means for rendering any set operable to transmit power from the source thereof to the driving wheels of the vehicle whereby to impart the desired speed to the vehicle.

Another object of the invention is to provide a transmission device of the character above described and in which the gears for effecting a change of speed are constantly in mesh, therefore obviating the necessity of engaging or disengaging gears with the consequent advantage of prolonging the life of the device and insuring durability.

A still further object of the invention is to provide a transmission device having the above named characteristics and means operable by the driver for effecting changes in speed of the vehicle by selecting and rendering one of the gear sets operative in a manner which will be hereinafter described.

A still further object of the invention is to provide a transmission device including constantly meshing gears and a novel form of clutch mechanism for rendering a desired set of gears operative to effect a transmission of power of the desired rate.

A still further object of the invention is to provide in a transmission device of the character above mentioned a novel form of reversing means, or a mechanism for effecting a reverse movement of drive of the vehicle, said means being operable by the controlling means mentioned above within reach of the operator.

In addition to the foregoing my invention comprehends improvements in the details of construction and arrangement of parts to be hereinafter more fully described and particularly set forth in the appended claims.

In the accompanying drawings in which similar and corresponding parts are designated by the same characters of reference throughout the several views in which they appear:—

Figure 1, is a view illustrating a longitudinal section of a power transmissinon device constructed after the manner of my invention.

Figs. 2 and 3, are transverse sections taken on the lines 2—2 and 3—3 respectively of Fig. 1.

Fig. 4, is a detail transverse section taken on the line 4—4 of Fig. 1.

Fig. 5, is a diagrammatic view in side elevation of the controlling or gear shifting lever associated with my transmission device.

Fig. 6, is a view of the controlling lever in edge elevation, and

Fig. 7, is a detail view in plan of the slotted guide for association with the control lever to indicate the position thereof and to limit its movement in a manner which will be hereinafter noted.

With reference to the drawing 10 indicates a casing for containing the mechanism of my power transmission device, 11 indicates the drive shaft having connection with the prime mover of the self-propellel vehicle, said shaft entering the casing at one end thereof and having in said end a socket or the like 12 to receive the reduced rounded end 13 of a propeller shaft 14 which passes through the casing longitudinally and out through the opposite end thereof in which the drive shaft 11 enters for connection with the differential (not shown) whereby the drive wheels of the vehicle are rotated. It will thus be noted that the drive and driven shafts 11 and 14, while placed end to end in longitudinal alinement and loosely connected are nevertheless adapted for relative rotation. The driven shaft 14 is also formed with a squared portion 15 which is interrupted at an intermediate point with a cylindrical or rounded portion 16. A counter shaft 17 is journaled at either end upon the end walls of the casing and is located entirely therewithin, disposed in parallelism to the shaft 14 and is provided at its forward end with a gear 18 which normally meshes with a gear 19 of corresponding size securely fixed to the end of the drive shaft 11. The counter shaft 17 is also adapted to support in fixed engagement "low" and "second" speed gears 21 and 22 respectively, in proper spaced relation and of different sizes to effect a change of speed.

To effect a change of speed and to initiate operation of any of the sets of gears selected, I provide three or more clutch devices indicated generally in Fig. 1 from left to right as 23, 24 and 25, respectively. While I have disclosed a device employing three clutch devices, it will be obvious as the description of the device proceeds that a lesser or greater number may be employed as required.

The clutch device 23 comprises a sleeve 26 having a rectangular opening in which to receive the squared portion 15 of the shaft 14 whereby the sleeve is secured to the shaft for rotation therewith but is permitted to have sliding movement relative to the shaft. The sleeve 26 carries on one end an integrally formed conical member 27 constituting the penetrative member of the clutch device for coaction with a receptive member 28 having a conical opening in which to receive the member 27, said receptive member 28 being fixedly secured to the drive shaft 11. It will be obvious that by sliding the sleeve 26 the penetrative member 27 may be moved into or out of the conical opening of the receptive member 28 to effect engagement therebetween in a manner which will be presently obvious.

The penetrative conical member 27 of the clutch device under discussion is provided adjacent its small end with a series of circumferentially spaced recesses 29 in which are located radially movable blocks 30. The sleeve 26 is circular in cross section exteriorly and a sleeve 31 is slidably embraced thereabout, said sleeves having at points spaced in a manner corresponding to the spacing of the recesses 29 and in number corresponding thereto with rack teeth 32. Adjacent each recess on the inner side of the penetrative member is a segment 33 pivotally held for meshing engagement with the adjacent series of rack teeth 32 each segment having an arm 34 which projects beneath its corresponding block 30 and is formed at its outer end with an opening through which a plug 35 extends. A flat spring 36 is secured at one end to each segment with the opposite ends of the springs secured to their respective plugs 35, the springs lying in contiguous relation to the arms. It will be obvious from the foregoing that if the sleeve 31 is moved longitudinally relative to the sleeve 26 each segment 33 will be oscillated to move its connected block projecting device 36 toward an outward or inward position as the case may be, said movement when outward serving to project the block 30 in a manner which will be presently noted. The receptive member 28 is likewise provided with a series of circumferentially spaced recesses 38 upon its inner surface adjacent the small end thereof.

As the description of the device proceeds it will be obvious that as many recesses 28, or blocks 30 may be provided as desired with the result that different effects are secured. In the present instance a device is illustrated having two oppositely disposed blocks 30 on the penetrative member, and five, uniformly spaced recesses 38 within the wall of the receptive member. The object is to provide a number of recesses 38 spaced in a manner whereby considering any relative position of the penetrative and receptive members, should the blocks be projected, the chances are that one of the blocks will engage in one of the recesses 38 immediately. Should however, the relative position of the penetrative and receptive members be such as to prohibit any immediate engagement of the block within a recess 38, slight relative rotary movement of the members will be sufficient to cause such engagement. It will be obvious that the recesses of the receptive member may be arranged in such relation, and number as to secure practically at all times an immediate engagement of one of the blocks within a recess to cause locking engagement between the members of the clutch.

The penetrative member 27 carries upon its large end an annular member 39 releasably connected to said penetrative member to move therewith. The annular member is formed with an enlargement 40 and a recess 41 oppositely disposed from said enlargement. A combined sleeve shifting and locking element 42 is supported within the annular member 39, said member 42 consisting of an elongated annular member having a lug 43 which is adapted to enter the recess 41 above mentioned, and an enlargement 44 opposite said lug 43, said enlargement having formed therein a rectangular aperture 45. A lug 46 is formed on said enlargement 44 for effecting a locking engagement of the member 42 with the casing 10 in a manner which will be presently noted. The member 42 as stated above is elongated and is formed with an elongated opening 47 which opening is constructed in a peculiar manner. The opening 47 passes through the material of the member 42 in a direction which is at an angle relative both to the axial and flat plane of the same member 42 thereby defining an inclined surface 48 adjacent the upper end of said member 42, or that end adjacent the enlargement 44, an inclined surface 49 being similarly formed adjacent the opposite end of the member. This construction is set forth clearly in Figs. 1 and 2 of the drawings. A disk 50 is provided having a central opening in which to receive the aforesaid sliding sleeve 31, said disk 50 having a double beveled periphery 51. The disk is seated within the peculiarly constructed opening 47 of the member 42 whereby the bevel at one side of the disk may engage the inclined wall 48 of the opening 47, while the opposite bevel similarly engages the inclined wall 49.

A gear engaging rod 52 is extended through the casing 10 of the transmission device in parallelism to the shaft 14 and through the above mentioned enlargement 40 of the annular member 41. The rod 52 also extends through the rectangular opening 45 formed in the enlargement 44 of the member 42, and the rod is formed within said opening with a cam member 53 which is adapted to engage the wall of the rectangular opening mentioned above.

Mounted upon the end wall of the casing interiorly thereof adjacent the clutch device 23 is an idler gear 54 which meshes normally with a reversing gear 55 fixed to the drive shaft 11, said gear 54 being adapted for meshing engagement with the above mentioned gear 18 when the latter is moved for that purpose toward said idler gear.

To accomplish such movement the gear 18 is connected through the medium of a link 61 to one arm 62 of a bell crank 63, the other arm 64 of the bell crank having a slotted portion through which a pin 65 fixed to a high speed gear shifting rod 63 projects which rod passes longitudinally through the transmission casing 10 and extends forwardly for connection to the control mechanism to be presently described. The rod 63 is adapted for slight longitudinal as well as rotative movement and the rocking of the bell crank 63 takes place through rotative movement of the rod 63 to effect an engagement or disengagement between the gears 18 and 54 in the manner above noted.

The clutch devices 24 and 25 each include a penetrative clutch member 64 and 65 respectively, and a receptive member 66 and 67 respectively, all of which are constructed in a manner identical with the corresponding parts of the clutch device 23, and similarly provided with radially movable blocks held within the penetrative members for engagement within recesses of the receptive members. The penetrative members 64 and 65 are however connected for sliding movement in unison through the medium of a sleeve 68 having a rectangular opening extending longitudinally therethrough in which to receive the squared portion 15 of the shaft 14, said sleeve 68 carrying a pair of sleeves 69 and 70 for coaction respectively with the penetrative members 64 and 65. These sleeves are for effecting movement of the blocks of the penetrative members 64 and 65 in a manner identical with the sleeve 33 described in connection with the clutch 23, and each sleeve 69 and 70 carries a disk 71 and 72 respectively whereby the sleeves are shifted. An annular member 73 is supported jointly between and upon the penetrative members 64 and 65, said annular member 73 being adapted to support combined sleeve shifting and locking members 74 and 75 for the sleeves 69 and 70. The shifting and locking members 74 and 75 are each provided with a lug 76 and 77 for a purpose similar to the lug 46 of the above mentioned shifting and locking member 42 of the clutch device 23. The annular member 73 is formed with an enlargement 78 similar to the enlargement 40 through which the gear engaging and releasing rod 52 extends. The rod is formed with a pair of cam members 80 and 81 which are adapted to be seated one at a time, respectively within openings formed in enlargements formed upon the members 74 and 75 respectively in a manner similar to the enlargement 44 and correlated parts of the member 42 of the clutch device 23.

The receptive members 66 and 67 are adapted for free rotation upon cylindrical portions of the shaft 14 as will be noted from Fig. 4 of the drawings, and the receptive member 66 carries for movement therewith a low speed gear 82 which is normally in meshing engagement with the low speed gear 21 of the counter shaft 17 while the receptive member 67 is similarly provided with a second speed gear 83 rotatable therewith for normal meshing engagement with the second speed gear 22 of said counter shaft 17.

The annular member 39 which supports the penetrative member 27 of the clutch device 23 is formed with a laterally extending lug 84 apertured to receive the shifting rod 63, which is locked to the lug to insure movement of said annular member as the rod 63 is shifted. The annular member 73 is similarly provided with a laterally extending lug 85 which is apertured to receive therein a longitudinally extending rod 86 which passes through the transmission case for sliding movement, said lug being secured thereto through any suitable means whereby the annular member 73 may be moved bodily and likewise the penetrative members 64 and 65 carried thereby as said rod 86 is shifted.

Proceeding now with the description of the controlling mechanism, for my improved transmission device, reference is had to Figs. 5 and 6 of the drawings wherein there is disclosed a manually operable lever 86' fulcrumed as at 87, said fulcrum point however being shiftable laterally as will be presently noted. The lever is adapted for oscillation within a stationarily mounted guide 88 having a slot 89 which is formed with lateral extensions 90, 91 and 92 all on one side of the guide, a central lateral extension 93 of the slot being extended in an opposite direction and disposed opposite the central lateral extension 92. As will be presently noted the slots 90 and 91 define positions of the lever to effect a change of speed to first and second, the slots 92 and 93 indicate position of the lever to effect an engagement of the third speed or to effect a reverse drive.

An arcuate slotted guide member 94 is provided through which the lever 86 moves said guide member being mounted for oscillation as at 95 whereby when the lever is shifted laterally the guide member 94 may be rocked. A shaft 96 is carried by said guide, said shaft being rotatable when the guide member is rocked in the manner above stated, a relatively large segmental gear 97 being fixedly secured to said shaft 96. A relatively small spur gear 98 is adapted for normal meshing engagement with the segment 97, said gear 98 being fixedly secured to the gear engaging and release rod 52 which extends through the transmission case as intimated above. It will be obvious from this as the guide 94 is rocked in one direction or the other the gear release rod 52 will similarly be rocked although to a greater extent than the guide 94.

The lower end of the lever 86 is connected as at 99 to the rod 86 which, as mentioned above is connected to the annular member 73 for operating the clutch devices 24 and 25. A relatively short lever 100 is fulcrumed at a point coincident with the fulcrum 87 of the lever 86, said fulcrum of the lever 100 being likewise shiftable laterally, the lower end of the lever 100 being connected as at 101 to the rod 63 which is connected to the annular member 41 of the clutch device 23 and also to the reversing mechanism. The rod 63 it will be noted is mounted for sliding movement in guides 102 permitting shifting and rotative movement of said rod 63. The lower end of the lever 100 may be formed in telescopic sections to permit rocking movement of the lever.

The lever 86' is formed with laterally extending lugs 103 which guide a rod 104 disposed parallel to said lever 86, the upper end of the rod passing through a guide 105. A spring 106 is interposed between said guide 105 and the lug 103 whereby to normally retain the rod 104 in a raised position, said rod being depressible through the medium of a button 107 provided upon the upper end whereby it may be engaged by the thumb of the operator as the guide 105 is grasped by the hand. The upper end of the lever 100 is formed with a recess 108 adapted to be entered by the lower end of the rod 104 when said rod is depressed. The guide 94 it will be noted, is provided with a slotted extension 109 disposed beneath the lateral extension 93 of the guide 88 to permit lateral movement of the lever 86.

Now that the connection between the controlling lever and the devices of the transmission have been established, it will be obvious that while the lever is within the slot 89, or has not been moved into any of the lateral extensions 90, 91, 92 or 93 thereof, the devices of the transmission will be disposed so that the penetrative members of each of the clutch devices 23, 24 and 25, will be out of engagement with their respective receptive members and the mechanism as an entirety will be in a neutral position.

To effect an engagement between the low speed gears whereby the vehicle may be started, the lever 86 is moved toward one end of the lateral slotted extension 90. Such movement of the lever will obviously shift the rod 86 to move the annular member 73 forward whereby to bring the members 64 and 66 of the clutch device 24 toward interengagement. The clutch members will however not become engaged subsequent to such movement, and if the master clutch of the vehicle is engaged, the rotation of the drive shaft 11 will be transmitted through the medium of the gears 19 and 18 to the counter shaft 17 which in turn will carry about its gears 21 and 22, the same in turn rotating the gears 54, 82 and 83 idly, without rotating the propeller shaft 14. However, to effect an engagement between the low speed gears the lever 86 is shifted laterally whereby the lug 103 thereof at the lower end of the lever may enter the lateral slotted extension 90, such lateral movement of the lever rocking the segmental gear 97 which in turn rocks the shaft 52 through the medium of a spur gear 98 to cause the cam 80 of said rod 52 to depress the combined gear engaging and locking member 74. As above mentioned, owing to the formation of the opening within said member 74, the disk 71 will be shifted forward in turn shifting the sleeve 69 upon which it is mounted to cause projection of the block supported upon the penetrative member 64 whereby said blocks may enter the recesses of the receptive member 66 to immediately cause a locking engagement between said members 64 and 66. Owing to the fact that the gear 82 is fast to the receptive member 66 the rotative movement of the counter shaft 17 will be transmitted through the gears 21 and 82 to the drive shaft 14. As the members 74 and 75 are raised during rotation of the engaging rod 52 through the medium of the cams 80 and 81, the lugs 76 and 77 of said members are caused to enter recesses 110 and 111 formed in the wall of the transmission case thereby locking the annular member 73 and consequently the penetrating members of the devices 24 and 25 against movement.

To effect a second change of speed, the lever 86 is shifted to the opposite end of the slotted guide however, previous to such movement of the lever the same is shifted laterally to disengage the lug 103 thereof from the lateral extension 90 of the slotted guide. Such lateral movement of the lever will have the effect to rock the rod 52 in a reverse direction thereby causing the cams 80 and 81 to move the members 74 and 75 downward whereby to cause the blocks of the penetrative members 64 of the clutch device 24 to be disengaged from the recesses of the receptive member. The lever may now be shifted to the opposite end of the slot in the manner above stated with the result that the annular member 73 is shifted in an opposite direction to bring the penetrative member 25 toward a position in engagement within the receptive member 67 of the clutch device 25. A subsequent lateral movement of the lever 66 to enter the lateral slotted extension 91 will again cause the rod 52 to rotate whereby to cause the members 74 and 75 to ascend and to cause the lugs 76 and 77 to enter recesses 112 and 113 in the transmission case thereby locking the annular member and consequently the penetrative members 64 and 65 against shifting movement. Previous to such movement of the members 74 and 75 or during such movement the blocks of the penetrative members 65 are moved radially whereby to enter the recess of the receptive member 67 thereby causing engagement between said members 65 and 67 and rotative movement of the counter shaft 17 will be transmitted through the medium of its gear 22 and the gear 83 to the shaft 14 thereby rotating said shaft at a high rate of speed owing to the different ratio of these gears 21 and 82.

The transmission mechanism may be thrown into high speed or direct drive by depressing the button 107 on the rod 104 while the lever 86 is in the position last described whereby the lower end of said rod may enter the recess 108 in the lever 100. By then moving the lever 86 while the button is thus depressed to the mid position of the slotted guide 88 the lever 100 will be carried with the said lever 86 with the result that the rod 63 is drawn forward thereby carrying the annular member 39 and the penetrative member 27 of the clutch member 23 forward toward a position for engagement with the receptive member 28. If the lever 86 is then shifted laterally to enter the lateral extension 92 the rod 52 will be rocked in a manner similar to that described above with the result that the member 42 will be raised through the action of the cam 53 of said rod 62 thereby moving the sleeve 31 inward with the result that the segments 33 are oscillated thereby moving the strip 13 forward with the result that the blocks are engaged thereby and the springs 31 are permitted to urge the strips 36 upward thereby moving the blocks 30 outward radially into engagement within adjacent recesses 38 of the receptive member 28. The penetrative and receptive members 27 and 28 will thus be locked into engagement and rotation of the shaft 11 will be transmitted directly through said members to the propeller shaft 14 without the intervention of any reduction gearing.

A reverse drive of the vehicle may be effected by shifting the lever 86 laterally into the elongated extension 93 of the slotted guide 88 with the result that the lever 100 is carried by said lever 86 thereby rocking the lever 100 laterally upon the rod 63 as a fulcrum with the result that said rod 63 is slightly rotated. It has been described above that the reversing gearing is connected to said rod 63 through the medium of the link 61 clearly set forth in Fig. 1, and rotation of said rod 63 will bring this mechanism into a position whereby the gears 54 and 18 are brought into engagement. Rotation of the counter shaft 17 will then be transmitted through the medium of the gear 20 to the gear 54 which is mounted upon the sleeve 26 in turn fixed to the propeller shaft 14. Said propeller shaft will thus be rotated in a direction reverse from that of the shaft 11 with the result that the vehicle is moved in a rearward direction. A return of the lever 86 to normal position within the slotted guide will immediately disengage the reversing gears. It will also be obvious that a reverse drive may be effected immediately regardless of what position the lever 86 may be in the slotted guide inasmuch as a movement of the lever out of any of the lateral extensions 90, 91 or 92 will disengage all the clutch devices 23, 24 and 25, permitting the immediate effecting of a reverse drive without possibility of damaging any of the mechanism.

It will be apparent from the foregoing that a separate clutch device is provided for each change of speed, and if desired the usual clutch of the motor vehicle may be omitted and the clutching operation taken care of by either of the above described devices. However, if desired a master clutch may be provided which could be moved toward engaging position subsequent to the engagement of any of the clutch devices 23, 24 and 25. This arrangement is entirely within the spirit of the invention and a master clutch may or may not be employed according to the requirements of those who may wish to use my invention. The crank case may be filled with oil thereby facilitating engagement between the several parts of the clutch devices and insuring their engagement in a more gradual manner. It will also be obvious that various arrangements, such as dash pots or the like may be utilized to control the engagement of the master clutch, if a master clutch is employed, or any other details devised and used which will facilitate the operation of my invention described above.

While I have illustrated and described my invention with some degree of particularity, I realize that in practice various alterations, thereof may be made, and I therefore desire to reserve the right and privilege of changing the form of the details of construction or otherwise altering the arrangement of the correlated parts, without departing from the spirit of the invention or the scope of the appended claims.

Having thus described my invention, what I claim as new and desire to secure by Letters Patent is:—

1. In a transmission device, a driving shaft, a driven shaft, a counter shaft, gearing normally connecting the driving shaft with the counter shaft, a clutch device including a pair of coacting members, one fixedly mounted upon the driving shaft, the other slidably mounted upon the driven shaft and fixed for rotation therewith, a slidable and rotatably mounted rod connected with the second member whereby to move the same into and out of engagement with the first member, a rotatably mounted rod journaled in said second member, means for causing engagement between said members when brought together, a means mounted in said second mentioned member of the clutch device for moving said last mentioned means, normally disengaged reverse gearing connecting said second mentioned member of the clutch device with the counter shaft, and means operable by rotation of said slidably and rotatably mounted rod for effecting engagement between said reverse gears to effect a reverse drive.

2. In a transmission device, a driving shaft, a driven shaft, a counter shaft, means for normally driving the counter shaft from the driving shaft, a clutch device including a pair of coacting members, one mounted upon the driving shaft, and the other slidably mounted upon the driven shaft and fixed for rotation therewith, means on the second mentioned member movable to engage the first mentioned member to cause mutual engagement between said members, a sliding means for causing engagement of said last mentioned means, a rotatably mounted rod adapted to move said sliding means whereby to effect engagement, and a slidably mounted rod for moving said second mentioned member of the clutch device toward engaging position whereby engagement between the members of the clutch may take place.

3. In a transmission device, a drive shaft, a driven shaft, a counter shaft, means for normally driving the counter shaft from the driving shaft, a clutch device including a receptive member fixed to the drive shaft, a penetrative member slidably mounted upon the driven shaft for rotation therewith, a sleeve slidably mounted upon the penetrative member, a plurality of radially movable members mounted upon the penetrative member, said receptive member having a plurality of recesses to receive said radially movable members, means for sliding said sleeve, a rotatably mounted rod engaging the last mentioned means whereby the sleeve may be moved to cause the penetrative member to be locked in engagement with the receptive member, and means for moving the penetrative member toward such position for the purpose set forth.

4. In a transmission device, a driving shaft, a driven shaft, a counter shaft, means for normally driving the counter shaft by the driving shaft, a clutch including a receptive member fixedly mounted upon the driving shaft, a penetrative member slidably mounted upon the driven shaft and adapted for rotation therewith, a gear rotatable with said penetrative member, a gear rotatable with the counter shaft, an idler normally engaging the second mentioned gear and adapted to be brought into engagement with the first mentioned gear, a slidably and rotatably mounted rod adapted to move said idler gear when rotated and when moved longitudinally to move the penetrative member toward engagement with the receptive member, radially movable blocks mounted upon the penetrative member, said receptive member having recesses to receive said blocks, means for projecting said blocks for engagement within the recesses, a member movable to cause said block projecting means to be actuated, and a rod rotatably mounted for moving said movable means.

5. In a transmission device, a driving shaft, a driven shaft, a counter shaft, means for normally driving the counter shaft, means for normally driving the counter shaft from the driving shaft, a clutch device comprising a receptive member fixedly mounted upon the driving shaft, a penetrative member slidably mounted upon the driven shaft, and rotatable therewith, a gear rotatable with the penetrative member, a gear rotatable with the counter shaft, an idler gear normally engaging the second mentioned gear and adapted to engage the first when moved, a slidably and rotatably mounted rod, means operable by the rod when rotated to bring the idler gear into meshing engagement with the first mentioned gear, means connecting the rod whereby when moved longitudinally it may move the penetrative member toward engagement with the receptive member, a lever operable to slide the rod when oscillated and when moved laterally to rotate the rod, a second rod, rotatably mounted, means on the penetrative member for engaging the receptive member, means operable by rotation of the second mentioned rod for causing said engaging means to be actuated, and means operable by the lever when moved laterally for rotating said last mentioned rod.

6. In a transmission device, a driving shaft, a driven shaft, a counter shaft, means for normally driving the counter shaft from the driving shaft, a clutch device including a receptive member fixed to the driving shaft, a penetrative member slidably mounted upon the driven shaft and adapted for rotation therewith, a gear rotatable with said penetrating member, a gear rotatable with the counter shaft, an idler gear normally engaging said second mentioned gear and adapted to engage the first mentioned gear, a second clutch device comprising receptive and penetrative members, the receptive member being normally rotatable relative to the driven shaft, a gear rotatable with said receptive member, a gear on the counter shaft normally engaging said last mentioned gear, a rod slidably and rotatably mounted, means operable by said rod when rotated to move the idler gear into meshing engagement with the first mentioned gear, a lever oscillatable to shift said rod longitudinally, means connecting said rod with the penetrative member of the first mentioned clutch whereby said penetrative member of the first mentioned clutch may be moved toward engaging position, said lever when shifted laterally being adapted to rotate the rod as and for the purpose set forth, a second rod slidable by said lever to shift the penetrative member of the second mentioned clutch device a third rod rotatably mounted, means on the penetrative members of each clutch device for causing engagement between the several members of the clutches and means operable by the lever when shifted laterally to rotate said last mentioned rod to cause such engagement.

In testimony whereof I affix my signature in presence of two witnesses.

WILLIAM G. WILL.

Witnesses:
    OSCAR L. WILSON,
    HARRY SCHLEICH.

Copies of this patent may be obtained for five cents each, by addressing the "Commissioner of Patents, Washington, D. C."